United States Patent Office 3,499,926
Patented Mar. 10, 1970

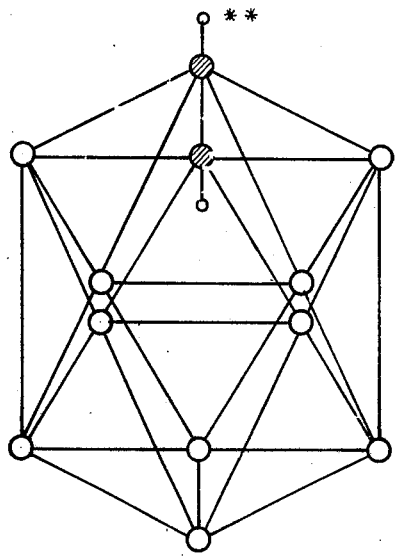
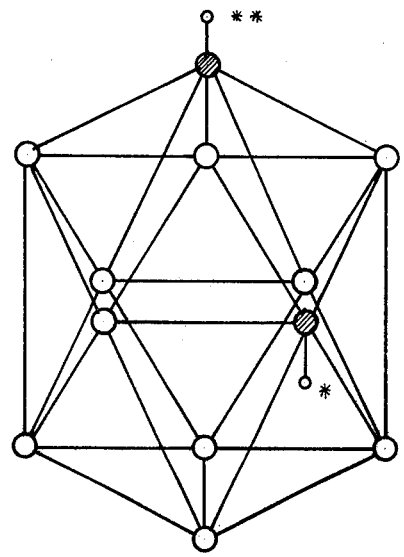
FORMULA I  FORMULA II
○ BORON
◐ CARBON
◦ HYDROGEN ON CARBON
(HYDROGEN ATOMS ON
BORON OMITTED FOR
CLARITY)
INVENTORS.
HANSJUERGEN A. SCHROEDER
ROY P. ALEXANDER
BY Walter D. Hunter
AGENT

3,499,926
POLYMERS OF META-CARBORANE ACYL CHLORIDES
Roy P. Alexander, Killingworth, and Hansjuergen A. Schroeder, Hamden, Conn., assignors to Olin Mathieson Chemical Corporation, a corporation of Virginia
Filed Jan. 24, 1966, Ser. No. 522,639
Int. Cl. C07c 51/58; C07d 107/02
U.S. Cl. 260—544      2 Claims

ABSTRACT OF THE DISCLOSURE

Polymers of the formula useful in solid propellant compositions:

$$Cl-CO-[-CB_{10}H_{(10-n)}R_n-CO-]_x-Cl$$

where $x$ is 2 to about 30, $n$ is an integer of from 0 to 10 and R is halogen or alkyl are prepared by reacting phosgene with the compound:

$$LiCB_{10}H_{10}CLi$$

in the presence of toluene and at a temperature between about 0° and about 40° C.

---

This invention relates to novel m-carborane polymers prepared by reacting phosgene with m-carboranes. In addition, this invention relates to a method for preparing m-carborane carboxylic acid dichlorides.

The novel compounds of this invention have the formula:

$$Cl-CO-[-CB_{10}H_{(10-n)}R_nC-CO-]_x-Cl$$

wherein $x$ is an integer of from 2 to 30, $n$ is an integer of from 0 to 10, R is selected from the group consisting of alkyl of from 1 to 5 carbon atoms and halogen selected from the group consisting of chlorine, bromine, iodine and fluorine and with the proviso that when R is alkyl then $n$ is 1. The compound of the above formula in which $x$ is 1 (that is, the compound $$ClCO-CB_{10}H_{(10-n)}R_nC-COCl)$$

is an m-carborane dicarboxylic acid dichloride.

The novel compounds of this invention are prepared by reacting a di(alkali metal)-m-carborane with phosgene at a temperature of from about −10° to about +80° C. and preferably from about 0 to about 40° C. The reaction can be conveniently carried out by adding a solution of phosgene in an inert organic solvent to a slurry of the di(alkali metal)-m-carborane compound in an inert organic solvent. Gaseous phosgene can also be added to a slurry of the carborane compound or the reaction can be conducted solely between liquid phosgene and the di(alkali metal-m-carborane.

Useful inert solvents include hydrocarbons, such as benzene, toluene, heptane, cyclohexane, etc. Generally, from about 1 to about 5 moles or more of phosgene will be reacted with each mole of the di(alkali metal)-m-carborane employed although it is preferred to utilize from about 1 mole of phosgene per mole of the carborane compound if a high yield of the polymeric product is desired with substantially no formation of the m-carborane carboxylic acid dichloride and from about 2 to about 5 moles of phosgene per mole of the starting carborane compound if it is desired to form the m-carborane carboxylic acid dichloride in substantial yield.

Recovery of the products can be accomplished by a variety of methods well known in the art. At the conclusion of the reaction the insoluble alkali metal chloride is removed by filtration, centrifugation, decantation or by any other convenient method after which the solvent employed is separated from the filtrate by distillation. From the remaining viscous liquid the products are recovered, for example, by extraction followed by distillation.

Ortho carborane (i.e., o-carborane) compounds useful ultimately in preparing the di(alkali metal)-m-carboranes which, in turn, are utilized as starting materials in the method of this invention can be prepared by the reaction of decaborane or an alkylated decaborane having an alkyl group containing 1 to 5 carbon atoms with acetylene, in the presence of a wide variety of ethers, amines or nitriles. The preparation of these compounds is described in application Ser. No. 741,976, filed June 13, 1958 of Ager, Heying and Mangold, now abandoned. For example, the compound o-carborane having the formula:

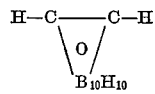

can be prepared by reacting for about 12 hours at 125° C. a mixture of decaborane and tetrahydrofuran in an autoclave pressured to 100 p.s.i. with acetylene.

When o-carboranes of the formula:

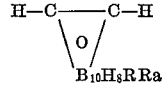

wherein R and Ra are each selected from the group consisting of hydrogen and alkyl of from 1 to 5 carbon atoms, are heated to a temperature above 400° C. a thermal isomerization takes place and the so-called meta- or m-carboranes are formed. For example, the compound o-carborane which has the formula:

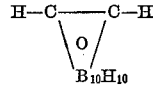

can be converted to m-carborane, that is, $HCB_{10}H_{10}CH$, by heating at a temperature of 475° C. for 5 to 20 hours. The structural formula of the compound o-carborane is shown as structural Formula I in FIGURE 1 while the structural formula of the compound m-carborane is shown as structural Formula II in FIGURE 1. Halogenated m-carborane compounds can be formed by the methods set forth in Heying and Schroeder application Ser. No. 414,947, filed Nov. 27, 1964 and in Schroeder and Smith application Ser. No. 379,859, filed July 2, 1964. For example, B-tetrachloro-m-carborane can be prepared by reacting gaseous chlorine with m-carborane in carbon tetrachloride and under ultraviolet irradiation.

The di(alkali metal)-m-carborane compounds which are useful as starting materials in the process of this invention can be prepared by the process described in Ager U.S. Patent 3,148,219 and have the formula:

$$MCB_{10}H_{(10-n)}R_nCM$$

wherein $n$ is an integer of from 0 to 10, M is an alkali metal selected from the group consisting of sodium, lithium, and potassium, R is selected from the group consisting of alkyl of from 1 to 5 carbon atoms and halogen selected from the group consisting of chlorine, bromine, iodine, and fluorine, and with the proviso that when R is alkyl then $n$ is 1. For example, C,C'-dilithio-m-carborane can be formed by reacting m-carborane wtih n-butyl lithium in the presence of dialkyl ether. Suitable di(alkali metal)-m-carboranes include C,C'-dilithio-B-methyl-m-carborane, C,C'-dilithio - B - isopropyl-m-carborane, C,C'-dilithio-B-amyl-m-carborane, C,C'-dilithio-B-chloro-m-carborane, C,C'-dilithio - B - fluoro-m-carborane, C,C'-dilithio-B-tetrachloro - m - carborane, C,C'-dilithio-B-iodo-m-carborane, C,C' - dilithio-B-dibromo-m-carborane, C,C'-dilithio-B-heptafluoro - m - carborane, C,C'-dilithio-B-decachloro-m-carborane, etc. and the corresponding sodium and potassium compounds.

The novel polymers of this invention are useful as fuels and when incorporated with suitable oxidizers, such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose of doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter the resin can be cured by resorting to heating at moderate temperatures. For further information concerning the formulation of solid propellant compositions, reference is made to U.S. Patent No. 2,622,277 to Bonnel et al. and U.S. Patent No. 2,646,596 to Thomas et al.

The example which follows illustrates one embodiment of this invention and is to be considered not limitative:

EXAMPLE I

Reaction of dilithio-m-carborane with phosgene

A dilithio-m-carborane (0.18 mole) slurry in toluene (400 ml.) was added, with stirring and ice-cooling to a solution of phosgene (54 g., 0.55 mole) in toluene (400 ml.). The resulting mixture was stirred for six hours at ambient temperature and then filtered. After removal of the toluene from the filtrate by vacuum distillation, the remaining viscous liquid was triturated with 400 ml. of petroleum ether (B.P. 30–60° C.) to give 7.2 g. of solid, polymeric product which was recrystallized from ethylene dichloride, M.P. 138–43° C.

Analysis.—Calc'd for $C_{16}H_{50}B_{50}Cl_2O_6$ (950.5): C, 20.22%; H, 5.30%; B, 56.92%; Cl, 7.46%. Found: C, 19.56%; H, 5.34%; B, 56.28%; Cl, 7.19%. Mol. weight (in chloroform) 971.

The formula of this polymer is shown below:

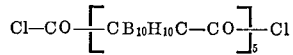

From the above filtrate the petroleum ether was evaporated and the remainder subjected to vacuum distillation. The highly viscous, polymeric distillation residue (8 g.) was free of volatile products and not further purified.

Analysis.—Calc'd for $C_{10}H_{30}Cl_2O_4$ (609.9): C, 19.69%; H, 4.96%; B, 53.22%; Cl, 11.63%. Found: C, 20.84%; H, 5.33%; B, 51.08%; Cl, 11.60%. Mol. weight (in benzene) 586.

The formula of this polymer is shown below:

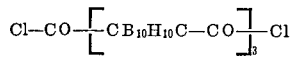

The structural formula of the compound $$m\text{-}B_{10}H_{10}C_2(COCL)_2$$

is the same as structural Formula II in FIGURE 1 except that the hydrogen atoms designated by the single and double asterisks are each replaced by the radical —COCl.

What is claimed is:
1. A material of the formula:

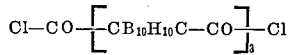

2. A material of the formula:

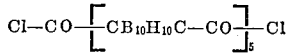

References Cited

UNITED STATES PATENTS 3,336,377  8/1967  Marcellis et al. _____ 260—544
3,226,429  12/1965  Grafstein et al. _____ 260—485

JAMES A. PATTEN, Primary Examiner

EDWARD GLEIMAN, Assistant Examiner

U.S. Cl. X.R.

149—22; 260—606.5

PO-1050
(5/69)

UNITED STATES PATENT OFFICE
CERTIFICATE OF CORRECTION

Patent No. 3,499,926                  Dated  March 10, 1970

Inventor(s) Roy P. Alexander and Hansjuergen A. Schroeder

It is certified that error appears in the above-identified patent and that said Letters Patent are hereby corrected as shown below:

Column 1, line 37, "2 to 30" should read --1 to 30--.

Column 1, line 57, "di(alkali metal-m-carborane" should read --di(alkali metal)-m-carborane--.

Column 2, line 67, "wtih" should read --with--.

In claims 1 and 2, each occurrence of "material" should read --meta-carborane--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,499,926      Dated March 10, 1970

Inventor(s) Roy P. Alexander and Hansjuergen A. Schroeder

It is certified that error appears in the above-identified patent and that said Letters Patent are hereby corrected as shown below:

Column 1, line 37, "2 to 30" should read --1 to 30--.

Column 1, line 57, "di(alkali metal-m-carborane" should read --di(alkali metal)-m-carborane--.

Column 2, line 67, "wtih" should read --with--.

In claims 1 and 2, each occurrence of "material" should read --meta-carborane--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents